INVENTOR.
BJARNE STORSAND

INVENTOR.
BJARNE STORSAND

United States Patent Office 3,541,409
Patented Nov. 17, 1970

3,541,409
SWITCHING ARRANGEMENT FOR FLYWHEEL ENERGIZED ELECTRIC GENERATING UNIT
Bjarne Storsand, Watt, Switzerland, assignor to Maschinenfabrik Oerlikon, Zurich, Switzerland
Filed Mar. 20, 1968, Ser. No. 714,565
Claims priority, application Switzerland, Nov. 10, 1967, 15,788/67
Int. Cl. H02k 7/02; H02p 7/34
U.S. Cl. 318—150     3 Claims

ABSTRACT OF THE DISCLOSURE

A flywheel energized electric generating unit for an electrically driven traction vehicle operating, between fixed charging stations, out of contact with any current supply line, includes a flywheel enclosed, together with associated rotary electric machines, within a gas-tight casing, and has either homopolar or heteropolar synchronous machines of the salient pole type with stationary excited or field windings as the electric machines. These electric machines have coilless rotors. The stator windings of the machines are connected to the A.C. terminals of a first rectifier arrangement constituted by controlled rectifiers. Exciter windings, on the casing of the flywheel unit, are connected to a first D.C. terminal of the rectifier arrangement and, through a smoothing choke to a first D.C. terminal of a second rectifier arrangement constituted by uncontrolled rectifiers fed from the normal A.C. distributing network. A switch is arranged to connect the second A.C. terminal of the second rectifier arrangement to a second D.C. terminal of the first rectifier arrangement. A second switch is operable to connect at least one traction motor, supplied by the electric machines, to the first rectifier arrangement.

BACKGROUND OF THE INVENTION

Electrically driven road vehicles operated by means of a flywheel serving to store mechanical energy have been known for some time. The energy storage unit comprises an electric machine or electric machines arranged, together with the flywheel, in a gas-tight casing whose interior is either under vacuum or contains a gas that is lighter than air such as, for example, hydrogen or helium, under a very low pressure. At stops of the vehicle, the electric machine is energized through a frequency converter fed from the A.C. distribution network to work as a motor and to accelerate the flywheel. During movement of the vehicle, the electric machine operates as a generator driven by the mechanical energy stored by the flywheel and withdrawing the mechanical energy from the flywheel. This withdrawn mechanical energy is thus converted into electrical energy used to drive one or more traction motors.

Vehicles of this type are particularly suitable as urban transportation means for relatively short distances, since they are free of any exhaust discharge and are noiseless. Additionally, they do not require either overhead lines or special rectifier stations, and are not limited to fixed routes or to travel over railway tracks.

SUMMARY OF THE INVENTION

This invention relates to switching arrangements for flywheel energized electric generating units of the type in which a flywheel, together with one or more electric machines connected thereto, is arranged in a gas-tight casing. More particularly, the present invention is directed to improved means for switching such a unit between a flywheel accelerating condition and a condition in which the flywheel drives the electric machine or machines to generate electricity.

The invention is based primarily on the problem of providing a trouble-free, short-circuit-resistant switching arrangement for flywheel units of this type, and is further directed to such a switching arrangement permitting a practically automatic charging of the rotational energy accumulator, of the electric machines, and of the electric valves used.

In accordance with the invention, the stator windings of synchronous machines equipped with coilless rotors are connected to A.C. terminals of an arrangement constituted by a set of solid state rectifiers feeding a second set of controlled solid state rectifiers feeding the flywheel set with a variable frequency. Exciter windings or coils, mounted in the casing of the flywheel unit, are connected to a first D.C. terminal of the rectifier arrangement and, through a smoothing choke, to a first D.C. terminal of another rectifier arrangement constituted by uncontrolled rectifiers. Switch means are provided to selectively interconnect second D.C. terminals of the two rectifier arrangements.

The synchronous electric machines used are homopolar or heteropolar synchronous machines of the salient pole type having stationary exciter or field coils. These machines permit, among other advantages, thermal relief of the rotating parts as well as of the bearings. The rotors, which are arranged on stub shafts of the flywheel, do not carry any windings, so that there are no ohmic losses due to such windings. Since the pressure inside the flywheel casing is less than 0.1 at., these ohmic losses are relatively difficult to eliminate, and this would lead, among other disadvantages, to considerable heat accumulations in the bearings.

An object of the present invention is to provide an improved switching arrangement for a flywheel energized electric generating circuit.

Another object of the invention is to provide such a switching arrangement which is trouble-free and short-circuit-resistant.

A further object of the invention is to provide such a switching arrangement permitting a practically automatic charging of the rotational energy accumulator, of the electric machines and of electric valves.

Yet, another object of the invention is to provide such a switching arrangement in which the stator windings of synchronous machines equipped with coilless rotors are connected to A.C. terminals of a frequency converter constituted by controlled rectifiers, and in which exciter windings, mounted in the casing of the flywheel unit, are connected to a first D.C. terminal of the rectifier and through a smoothing choke to a first D.C. terminal of a second rectifier constituted by uncontrolled rectifiers.

A further object of the invention is to provide such an arrangement in which a selectively operable switch may be used to connect second D.C. terminals of the frequency converter.

Still another object of the invention is to provide such a switching arrangement which is useable with flywheel energized electric generating units in which the synchronous machines are homopolar or heteropolar machines of the salient pole type with stationary exciter windings.

BRIEF DESCRIPTION OF THE DRAWINGS

For an understanding of the principles of the invention, reference is made to the following description of typical embodiments thereof as illustrated in the accompanying drawings.

In the drawings.

DESCRIPTION OF THE PREFERRED EMBODIMENTS

Figure 1:
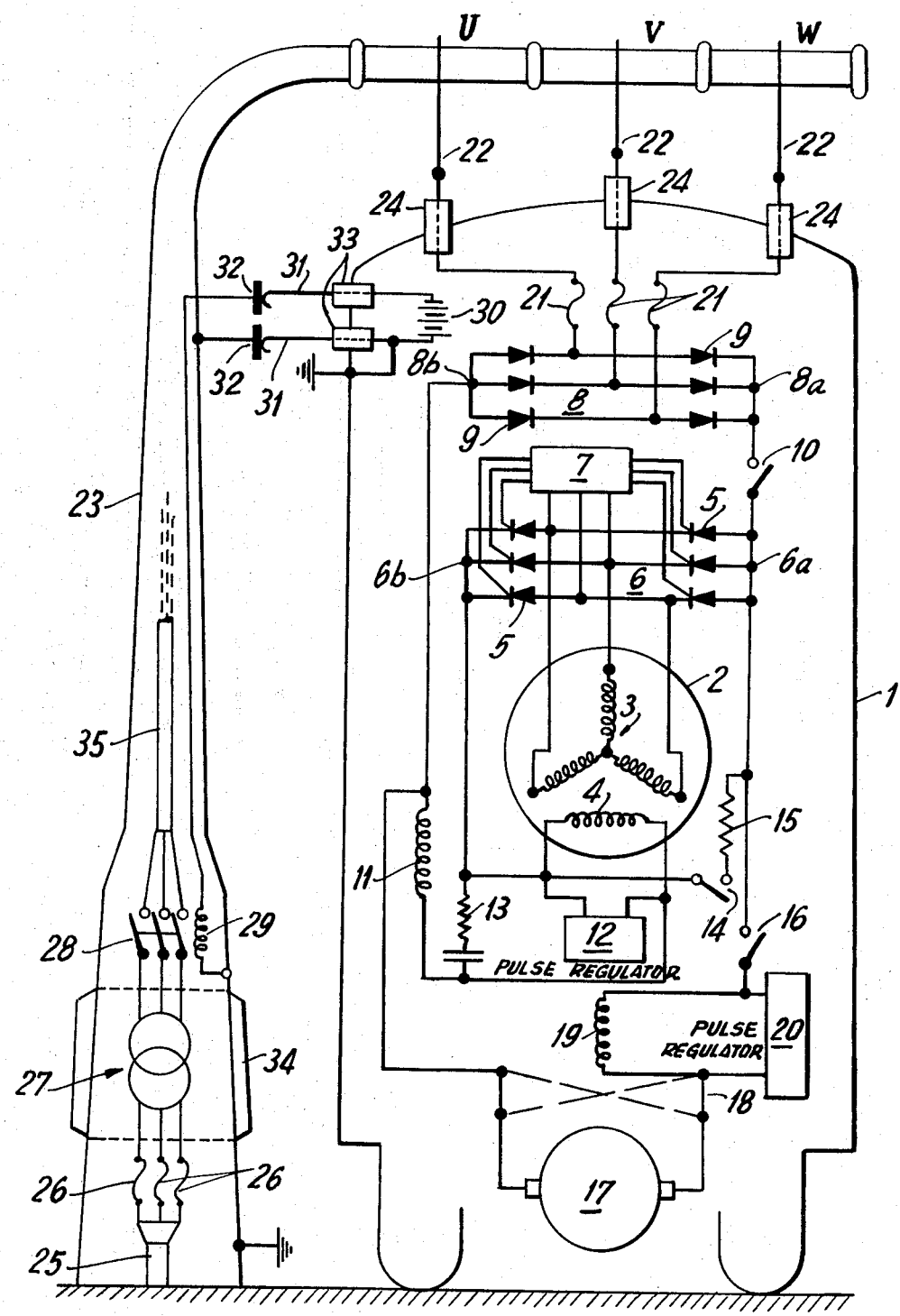
FIG. 1 is a somewhat schematic illustration of a vehicle and a charging mast, including a schematic wiring diagram of the electrical connections.

Referring to FIG. 1, the transverse contour of a vehicle is designated at 1, with the circle 2 indicating the flywheel energized electric generating unit thereon. Coilless rotors of electric machines are mounted on shafts of the flywheel (not shown), and preferably constitute the rotors of homopolar or heteropolar synchronous machines of the salient pole type with stationary exciter widings 4 and stator windings 3. The electric circuitry includes a rectifier arrangement 6 comprising controlled silicon valves or rectifiers 5 which are controlled, through the medium of a control device 7, by the windings 3 and 4 of the electric machines, working as a frequency converter.

A second rectifier arrangement 8 is illustrated as having uncontrolled, preferably silicon, solid state rectifiers 9, and the coupled cathodes of rectifier arrangement 8, at the D.C. output terminal 8a, can be connected through a first switch 10 with the coupled anodes of the rectifier arrangement 6, at the D.C. input terminal 6a. The coupled cathodes, at the D.C. output terminal 6b, are connected to exciting windings 4 and through a smoothing choke 11 to the coupled anodes of the rectifier arrangement 8 at the D.C. input terminal 8b of the latter.

A first pulse regulator 12, as well as an RC member 13, are connected in parallel with the exciter windings of the electric machines assembled with the flywheel. By means of an exciter switch 14 in series with and exciter resistance 15, exciter windings 4 can be connected, when switch 10 is closed, to a D.C. terminal of the rectifier arrangement 8. A second switch 16 is operable to connect a traction motor 17 with rectifier arrangement 6. Traction motor 17 includes an armature reversing switch 18 and a series field winding 19. A second pulse regulator 20 is connected in parallel with series field winding 19.

Through fuses 21, the rectifier arrangement 8 is connected to current collectors 22 by means of leads extending through bushings or ducts 24 of the vehicle. Current collectors 22 are arranged to engage the rotatable terminals U, V and W of a three-phase source of potential, these terminals being supported on a charging mast 23 which is preferably transportable. A current supply line 25 extends into the base of mast 23 and is connected, by fuses 26, to a feed transformer generally indicated at 27 and constituted by three single-phase transformers having a high magnetic leakage.

Transformer 27 is connected with a main switch 28 operable by an operating coil or winding 29. Winding 29 is energized from a battery 30, on vehicle 1, as soon as contacts 31 on the vehicle engage opposing contacts 32 on mast 23, the leads connecting battery 30 to contacts 31 extending through ducts or bushings 33 of the vehicle. The base of mast 23 is designed as an oil tank provided with cooling fins 34 and enclosing feed transformer 27 as well as any additional chokes, which have not been shown in the drawings. Feed lines 35, which are only partially indicated, lead from the terminals of main switch 28 to the three phase-terminals U, V and W of mast 23.

The operation of the switching arangement will now be described. When the vehicle arrives at charging mast 23, both current-collectors 22 and contacts 31 are engaged with the corresponding contacts U, V, W and contacts 32 of mast 23. Battery 30 energizes winding or coil 29 which closes main switch 28, and contacts U, V and W are energized through feed lines 35. Rectifier arrangement 8 transforms the three-phase voltage into a D.C. voltage.

If both switch 10 and exciter switch 14 are now closed, rectifier arrangement 8 feeds exciter winding 4 through exciter resistance 15, and also effects current flow through smoothing choke 11. Provided the flywheel is still rotating, a voltage is produced in stator winding 3 and is applied to the A.C. terminals of rectifier arrangement 6, as well as to control device 7. As soon as this voltage has reached a value sufficient to effect conductivity of rectifiers 5 through control device 7, exciter switch 14 is opened. Current now flows from rectifier arrangement 8 through rectifier arrangement 6, exciter winding 4 and smoothing choke 11 back to rectifier 8, and energy from rectifier arrangement 8 is delivered to stator windings 3. Rectifier arrangement 6 thus works as an inverter whose frequency is determined by the synchronous machine and which is, in the present case, a multiple of the commercial or main frequency. Values up to 400–900 cycles/sec. are suitable for accelerating the flywheel set. The flywheel is accelerated by the rotors of the electric machines, and which are secured to the flywheel shafts, and is brought to speed of up to about 8,000 min.$^{-1}$. During discharge, the speed drops to about 4,000 min.$^{-1}$. In order to accelerate a stationary flywheel, the synchronous machines can be started asynchronously and then synchronized.

After charging of the rotational energy accumulator, current collectors 22 and contacts 31 are retracted from their cooperating contacts on mast 23, and switch 10 is opened. In order to change over to driving of the vehicle, switch 16 is closed. The rectifier arrangement 6 now transforms the three-phase voltage, supplied by stator windings 3, into a D.C. voltage. A D.C. current flows through exciter winding 4, smoothing choke 11, the armature of traction motor 17 and the series field winding 19 of the motor. The size of the current flowing through exciter winding 4 can be adjusted continuously to predetermined values by means of pulse regulator 12. RC member 13 serves to divert harmonics from exciter windings 4.

In order to permit a feedback of energy during electric braking, rectifier arrangement 6 is blocked and the switching arrangement is changed over to inverter operation. In addition, the polarity of the armature circuit of traction motor 17 must be reversed by means of reversing switch 18. Pulse regulator 20 serves to influence the current of series field winding 19, and thus to control the braking energy. At the start of the energy recuperation, the synchronous machines are pre-excited, so that switch 14 is closed briefly.

Figure 2:
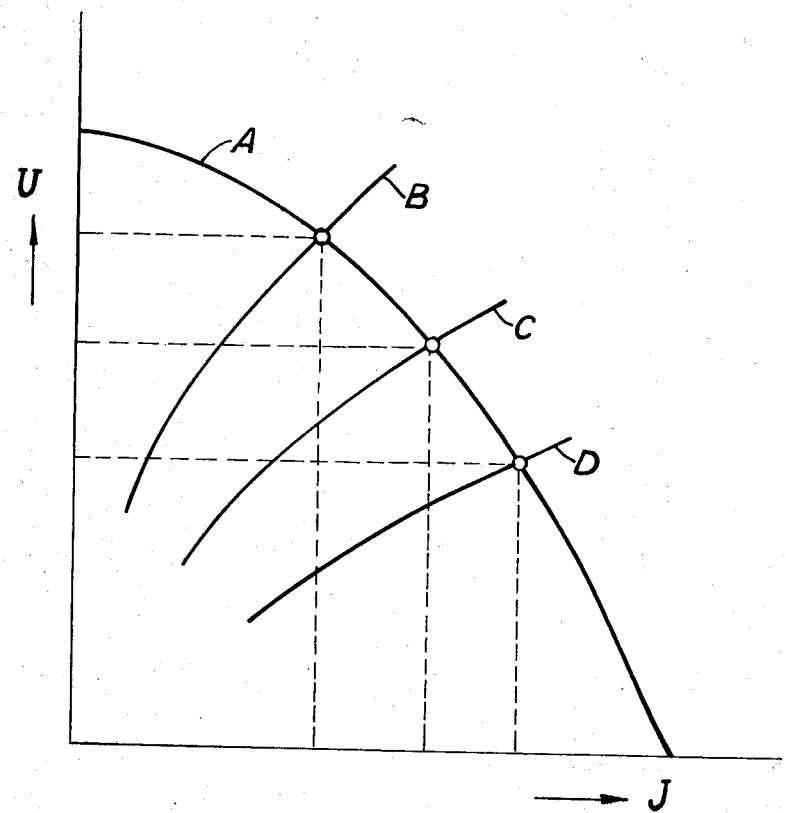
FIG. 2 is a graphic illustration of the characteristics of an inverter forming part of the switching arrangement.

FIG. 2 graphically illustrates the current-voltage characteristic of the inverter comprising rectifier arrangement 6 and rectifier arrangement 8. The direct current J is plotted as the abcissa, and the D.C. voltage U is plotted at the ordinate. Curve A corresponds to the current-voltage course of the rectifier arrangement 8. This curve is obtained by using a feed transformer 27 having high magnetic leakage, or by means of additional chokes which have not been shown in FIG. 1. The family of curves B, C and D refers to the relations between current and voltage of the machine-controlled arrangements 6 operating as an inverter. Characteristic curve B applies to the nominal speed of the flywheel, curve C to 75% of the nominal speed and curve D to 50% of the nominal speed. The intersections between curve A and curves B, C and D represent the stable operating points of the inverter, whose power input, which is proportional to the rectangles represented by broken lines in FIG. 2, remains approximately constant.

The described switching arrangement thus avoids both overloading of the mains and excessive loading of the inverter, so that arc-overs can be avoided. Other advantages reside in the practically automatic charging of the accumulator energy at stops of the vehicle, and in the provision for recovering energy during braking.

Figure 3:
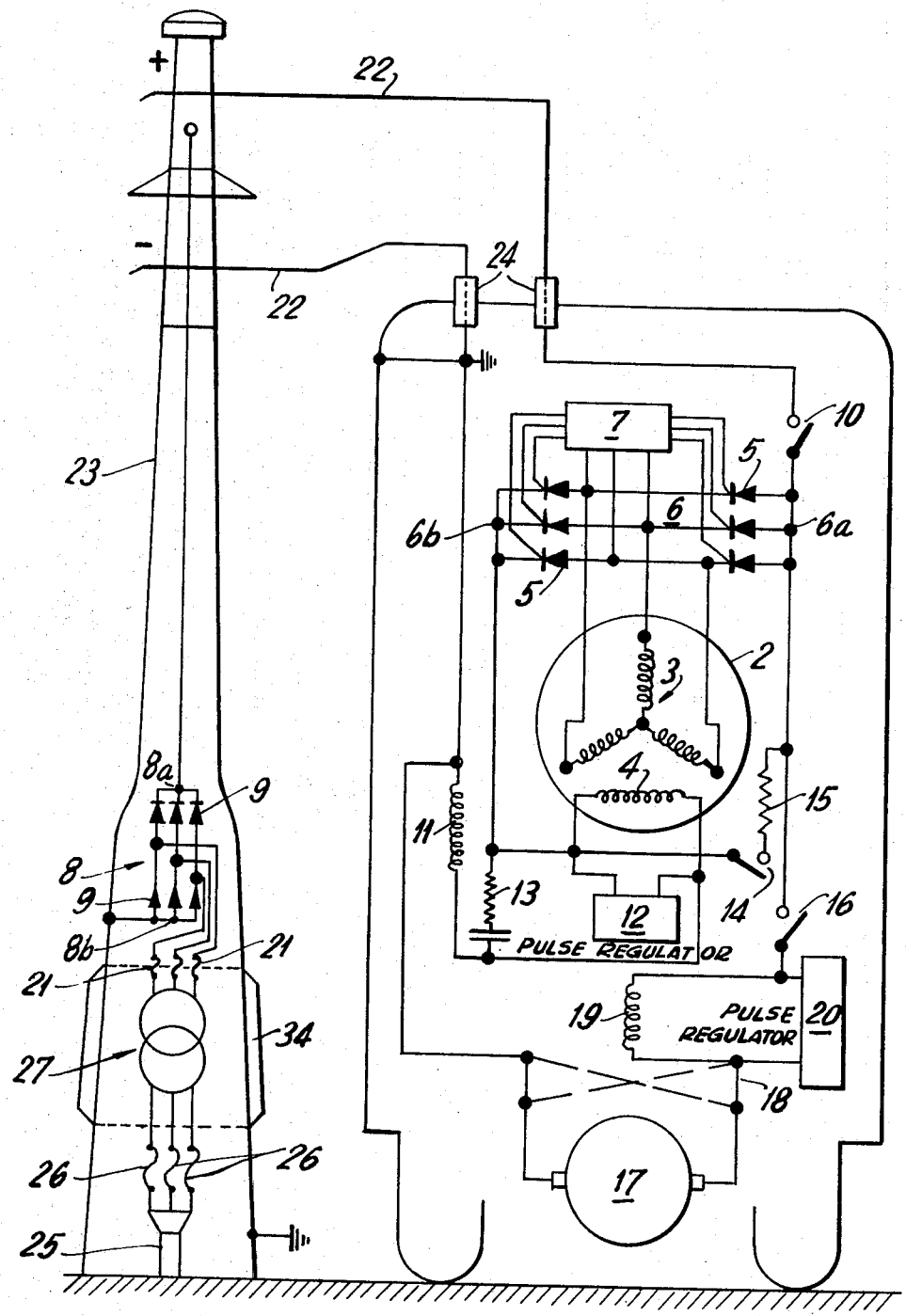
FIG. 3 is a view, similar to FIG. 1, illustrating a modification of the switching arrangement.

In the arrangement of FIG. 1, charging mast 23 has the form of a whip and rectifier arrangement 8 is housed in the vehicle. In a variation of this construction, the rectifier arrangement 8 can be provided in the base of the charging mast, as shown in FIG. 3, in which the same parts are designated with the same reference numerals. By this arrangement, a certain simplification can be attained, since only two ducts 24 and two current collectors 22 are required. The grounding of the vehicle is likewise simplified, provided one pole 8b of rectifier arrangement 8 is grounded. Also, the boom, used on mast 23 as illustrated in FIG. 1, can be eliminated in the arrangement of FIG. 3.

While specific embodiments of the invention have been shown and described in detail to illustrate the application of the principles of the invention, it will be understood that the invention may be embodied otherwise without departing from such principles.

What is claimed is:

1. In an electric traction vehicle, rechargeable from a current supply at fixed charging stations and operating, between charging stations, out of contact with the current supply line, the current supply including an A.C. to D.C. converter means and the vehicle having a gas-tight casing enclosing a flywheel and a flywheel-energized rotary electric generating unit for driving at least one traction motor for propelling the vehicle; the improvement comprising, in combination, said generating unit comprising stator windings and coilless rotors, with the rotors rotatable with said flywheel, and at least one exciter winding; an inverter arrangement composed of controlled rectifiers; means connecting said stator windings to said inverter arrangement; means connecting one common terminal of said inverter arrangement to one terminal of said exciter winding; means connecting the other terminal of said exciter winding to a first output terminal of said A.C. to D.C. converting means; a first switch electrically operable to connect the other common terminal of said inverter arrangement to a second output terminal of said A.C. to D.C. converting means; and a second switch selectively operable in alternation with said first switch to connect said other common terminal of said inverter arrangement to said traction motor.

2. In an electric traction vehicle, the improcement claimed in claim 1, including a charging mast at each charging station; a source of A.C. potential in each charging mast; separate contacts on each charging mast connected to said source of A.C. potential; separate current collectors on said vehicle each engageable with a respective contact on a charging mast; said A.C. to D.C. converter means comprising a full wave rectifier in said vehicle connected to said separate contacts.

3. In an electric traction vehicle, the improvement claimed in claim 1, including a charging mast at each charging station; a source of A.C. potential at each charging mast; said A.C. to D.C. converting means being mounted in said mast and being constituted by a full wave rectifier connected to the source of A.C. potential; separate contacts on said mast each connected to a respective D.C. output terminal of said full wave rectifier; separate current collectors on said vehicle each engageable with a respective mast contact; said first and second output terminals of said A.C. to D.C. converting means each being connected to a respective vehicle contact.

References Cited
UNITED STATES PATENTS

| 2,589,453 | 3/1952 | Storsand | 318—150 |
| 3,383,575 | 5/1968 | Bobo | 318—193 |

ORIS L. RADER, Primary Examiner

T. L. CROSSON, Assistant Examiner

U.S. Cl. X.R.

318—161; 322—4